No. 771,381. PATENTED OCT. 4, 1904.
H. C. MILLER.
LOOSE LEAF BOOK.
APPLICATION FILED MAR. 22, 1901. RENEWED AUG. 31, 1904.
NO MODEL.

Witnesses:
C. N. Keeney.
Anna V. Faust.

Inventor:
Henry C. Miller.
By Benedict & Morsell.
Attorneys.

No. 771,381.

Patented October 4, 1904.

UNITED STATES PATENT OFFICE.

HENRY C. MILLER, OF MILWAUKEE, WISCONSIN.

LOOSE-LEAF BOOK.

SPECIFICATION forming part of Letters Patent No. 771,381, dated October 4, 1904.

Application filed March 22, 1901. Renewed August 31, 1904. Serial No. 222,872. (No model.)

*To all whom it may concern:*

Be it known that I, HENRY C. MILLER, residing at Milwaukee, in the county of Milwaukee and State of Wisconsin, have invented a new and useful Improvement in Loose-Leaf Books, of which the following is a description, reference being had to the accompanying drawings, which are a part of this specification.

My invention has relation to improvements in loose-leaf books.

It consists particularly in certain improvements upon the loose-leaf ledger or book covered in United States Letters Patent No. 587,986, issued to myself and Julius Bauer on August 10, 1897. In the patent referred to a loose-leaf ledger is shown wherein a series of revoluble telescoping posts are employed for locking the removable leaves of the ledger in place, the said posts being wider in transverse section in one direction than in the other, so as to normally hold the leaves of the ledger in locked position, the wider portion of each post extending across a circular opening in the leaf. In the construction of the patent referred to when it is required to remove a leaf or leaves it is necessary to turn each set of telescoping posts separately in order to bring their greatest width in line with straight slots running rearwardly from the circular openings of the leaves to the rear edges of said leaves, and when the leaves are inserted in place it is necessary to again turn each telescoping post separately in order to bring the widest portion of each of said telescoping posts at right angles to the length of the slots.

It is one of the objects of my present invention to provide a construction whereby by one manipulation all the several sets of telescoping leaf-holding posts are turned simultaneously.

A further object is the provision of an improved form of locking mechanism for automatically locking the covers of the ledger in any position apart to which they may be adjusted.

A further object is to provide a construction whereby with one manipulation both the locking mechanism and the telescoping posts are operated.

With the above primary objects in view the invention consists of the devices and parts or their equivalents, as hereinafter set forth.

Figure 1:
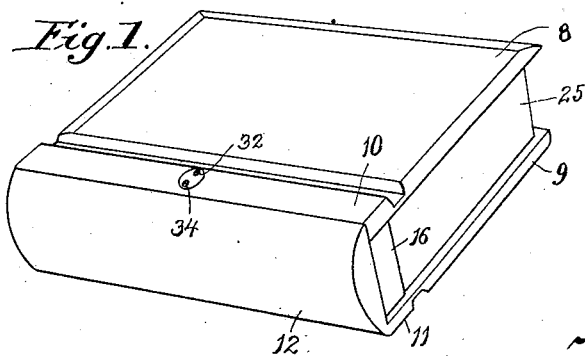
Figure 2:
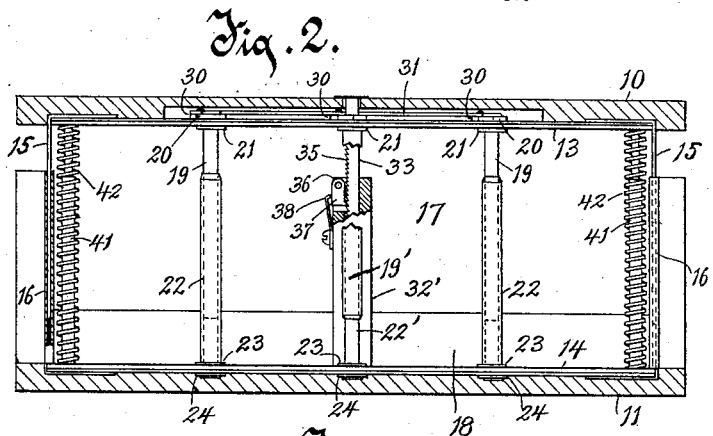
Figure 3:
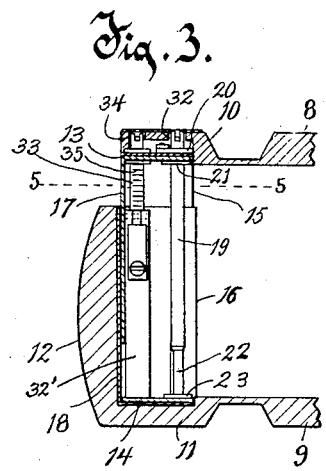
Figure 4:
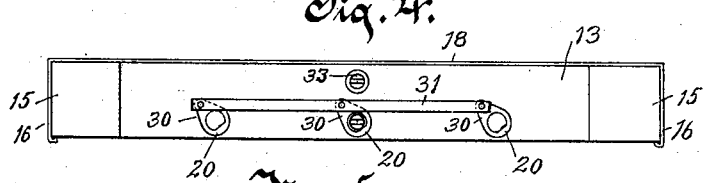
Figure 5:
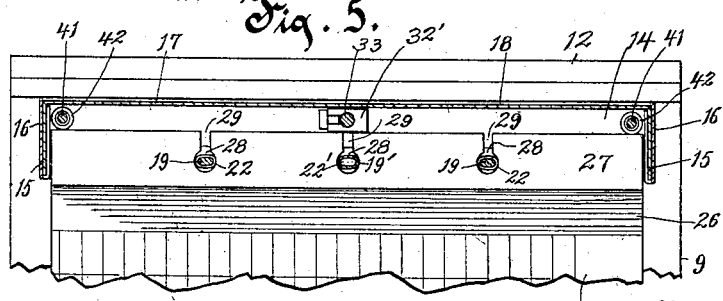
Figure 6:
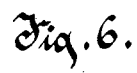
Figure 8:
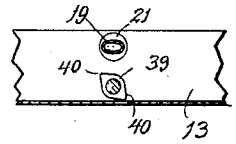
Figure 7:
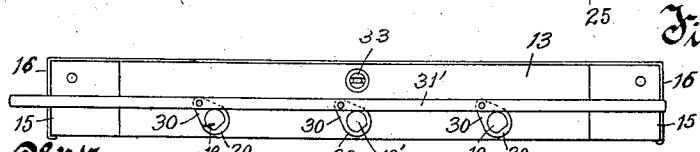

In the accompanying drawings, Figure 1 is a perspective view of a loose-leaf ledger embodying my improvements. Fig. 2 is a section longitudinally through the rear binding-pieces of the ledger, certain parts being broken away. Fig. 3 is a central longitudinal section through a fragment of the ledger. Fig. 4 is a plan view of the means for simultaneously turning all the telescoping posts. Fig. 5 is a section on the line 5 5 of Fig. 3. Fig. 6 is a section on the same line, but looking upwardly. Fig. 7 is a view of a modified form of means for simultaneously revolving the telescoping posts, and Fig. 8 is a fragmentary detail of a modification.

Referring to the drawings, the numerals 8 and 9 indicate the side pieces constituting the cover of the ledger, and 10 and 11, respectively, the rear binding-pieces, which are hinged in the usual manner to the side pieces. The binding-piece 11 is provided with an upwardly-extending back piece 12.

Within the rear binding-pieces are arranged the upper and lower longitudinal strips 13 and 14, respectively, which strips are preferably of metal. These strips may be provided, respectively, with upwardly-extending end pieces, the end pieces 15 15 of the strip 13 fitting and telescoping in the tubular end pieces 16 16 of the strip 14. These longitudinal strips 13 and 14 may also be provided, respectively, with back pieces 17 and 18, which are fitted slidingly together.

The strip 13 has depending therefrom a series of post-sections, the outer of said post-sections being indicated by the numerals 19 19 and the intermediate one by the numeral 19'. The ends of these post-sections are revolubly mounted in the strip 13, each being preferably revolubly suspended by means of a flange 20, resting on the upper side of said strip. A similar flange 21, bearing against the under side of the strip 13, may also be provided to prevent up movement of said post-sections. The two outer post-sections 19 are adapted to telescopically fit in revoluble tubular post-sections 22 22, extending upwardly from the lower strip 14. An intermediate revoluble post-section 22' also extends upwardly from the strip 14 and telescopes into the upper intermediate tubular post-section 19'. The particular arrangement described is not important, however, as it is obvious that all of one series of post-sections might be tubular and all of the post-sections of the other series telescopically fitted in said tubular sections.

The revoluble engagement of the post-sections 22 and the post-section 22' with the strip 14 may be secured by passing the ends of said post-sections through the strip 14 and providing each with a flange 23, resting on the upper side of the strip 14, and, if desired, a similar flange 24 may be provided on the extremity of each of said post-sections 22 and the post-section 22', adapted to bear on the under side of the strip 14 and prevent uplifting of said tubular post-sections. These post-sections 19 and 22 and 19' and 22' are advisably of such shape in cross-section as to have a greater width in one direction than in the other, as most clearly shown in Fig. 6.

The leaves 25, which are inserted between the side pieces of the cover, are usually provided with a hinge 26, of linen or muslin, pasted to the rear edge of the leaf and having a rectangular reinforcing-strip 27 on the rear edge of the hinge. This rectangular reinforcing-strip is provided with openings 28, from which lead straight openings or slots 29, extending to the rear edge of said reinforcing-strip. The openings 28 are so positioned on the reinforcing-strip as when the leaves are inserted in place between the side pieces of the cover that said openings will register with the upwardly-extending post-sections 22.

One of the main objects of my present invention is to provide for turning all of the telescoping post-sections simultaneously instead of separately, as is the case with constructions now in use. I herein show for accomplishing this purpose a construction wherein corresponding ends of similar sections of the telescoping posts are provided (in the present illustration the post-sections 19 and the post-section 19' are shown as so provided) with cranks 30, which are shown as located above the strip 13 and extending from the flanges 20, and connecting these cranks is a bar 31. It is of course obvious that by moving said bar all of the post-sections are revolved simultaneously. The movement of the bar may be accomplished in various ways; but I prefer to extend upwardly one of the post-sections, (advisably the central post-section 19',) the extended end passing into an opening 32 in the binding-piece 10, the extremity of said upwardly-extending end being provided with a niche for the insertion of a key. (Not shown.) When the key is inserted in the niche and turned, the telescoping posts are thereby given approximately a quarter-turn, the limit of turning being regulated in either direction by contact of the bar 31 with the extended end of the post-section.

In Fig. 7 I show a modified construction wherein the necessity of employing a key for turning the telescoping posts simultaneously is dispensed with, as well as the necessity of extending one of the post-sections upwardly into an opening 32. This consists in making the operating-bar (designated in the modified form by the numeral 31') considerably longer than the bar 31, so that its ends will just project beyond the lateral side edges of the binding-piece 10. In this arrangement all that is necessary is to exert finger-pressure on either extended end of the bar 31' in accordance with the direction which it is desired that the telescoping posts should be revolved.

While I have shown the post-sections 19 and the post-section 19' as depending from the strip 13 and the post-sections 22 and section 22' as extending upwardly from the strip 14, it is obvious that this arrangement may be reversed—that is to say, the tubular post-sections 22 and section 22' may project downwardly from the strip 13 and the post-sections 19 and section 19' project upwardly from the strip 14 and the same function accomplished. The bar 31 and the means for operating the same could also be arranged adjacent to the strip 14 without departing from the spirit and scope of my invention.

Referring to the improved locking mechanism illustrated in the accompanying drawings, the numeral 32' indicates a tubular upright extending upwardly from the lower strip 14, and depending from the strip 13 and fitting in the tubular upright 32' is a locking-rod 33. The upper end of this locking-rod passes freely through an opening in the strip 13 and extends into an opening 34 in the binding-piece 10. The extremity of this extended end of the locking-rod is provided with a niche adapted for the insertion of a key. (Not shown.) The locking-rod is provided longitudinally with a series of teeth 35 and one side of the upright 32' is provided with a recess 36, in which is pivoted a locking-dog 37, the said recess communicating with the central opening of the tubular standard, so that the end of the dog is free to engage with the teeth of the locking-rod. The dog is acted upon by the free end of a spring 38, which normally holds the dog in locking engagement with the teeth. The locking-rod has also mounted thereon a collar 39, provided with projecting ends 40 40, which are adapted as the locking-rod is turned to contact with the back piece 17 of the strip 13, and thereby limit the extent of turning said locking-rod.

Normally the locking-rod is turned so that the teeth 35 are engaged by the dog 37. In this position of the locking-rod it is evident that it is impossible to adjust the side pieces or covers of the book farther apart. When, however, it is desired to effect the said adjustment, a key is inserted in the niche formed in the extended end of the locking-rod and said rod turned to the limit permitted, which limit is sufficient to bring the teeth 35 out of engagement with the dog 37. When thus disengaged, the covers of the book may be readily adjusted farther apart, and when the desired adjustment is secured the locking-rod is again turned so as to bring the teeth into position to be engaged by the locking-dog, and thereby lock the cover-sections in the book in the position to which they have been adjusted.

It is desirable that when the cover-sections are unlocked, as described, said cover-sections will automatically separate. To provide for this, I connect opposite ends of the strips 13 and 14 with telescoping non-revoluble post-sections 41 41, and these telescoping sections are encircled by coiled springs 42 42, the opposite ends of said springs bearing, respectively, against the strips 13 and 14. It is apparent that when the cover-sections are unlocked the upward pressure of the springs will automatically separate the strips 13 and 14, and consequently the cover-pieces of the book, which are attached thereto. When it is desired to bring the cover-sections closer together, it is necessary to press the same together against the contrary force exerted by these springs 42.

To remove or insert a leaf, all that is necessary to be done is to unlock the ledger in the manner pointed out. The tubular post-sections are then turned so as to bring their greatest width in line with the slots 29 of the leaves. When the post-sections are in this position, it will be obvious that either additional leaves may be readily inserted in place or leaves removed from between the side pieces of the ledger, and when it is again desired to secure the leaves in place all that is necessary is to turn the telescoping posts to the position shown in Fig. 5—that is to say, with their greatest width transverse of the slots 29.

In Fig. 8 of the drawings I show a modified form of construction whereby I am enabled by a single operation to lock or unlock the locking mechanism and at the same time turn the revoluble posts. To accomplish this, I merely provide the upper end of the locking-rod with a crank 41, said crank being provided with a slot 42, into which a pin 43, projecting from the bar 31, extends. It is obvious that by turning either the locking-rod 33 or the telescoping post-section 19' both the locking mechanism and the telescoping posts are operated simultaneously. In the illustration I have shown the rod 33 provided with a niche for the insertion of a key; but of course, if preferred, this niche could be provided in the upper end of the post-section 19'.

What I claim as my invention is—

1. In a loose-leaf book wherein leaves are secured and released, the combination of telescoping rocking posts, the cross-section of which is of greater diameter in one direction than the other, and one of said posts being extended for the engagement therewith of a suitable turning device, and each of said posts when in one position adapted to enter narrow slots cut inward from the rear edge of the leaf and corresponding with the smallest diameter of the posts, and each of said posts also adapted to secure the leaves by reaching and being rocked in enlargements of said slots to bring the longer diameter athwart thereof, cranks upon the ends of the telescoping rocking posts, and a bar connecting said cranks and adapted, when operated, to cause all the posts to rotate together.

2. In a loose-leaf book, the combination of parallel longitudinal strips, telescoping revoluble posts connecting the longitudinal strips, a connection between said posts, locking mechanism, and a connection between the locking mechanism and the connecting medium of the posts, said connection adapted, when operated, to cause the simultaneous operation of the locking mechanism and the turning of the revoluble posts.

3. In a loose-leaf book, the combination of parallel longitudinal strips, telescoping revoluble posts connecting the longitudinal strips, cranks upon the ends of corresponding post-sections, a bar connecting said cranks, a turnable locking-bar, and a connection between said locking-bar, and the bar which connects the cranks, whereby when a turning of either the locking-bar or of one set of telescoping posts is effected, the locking mechanism and the telescoping posts are simultaneously operated.

In testimony whereof I affix my signature in presence of two witnesses.

HENRY C. MILLER.

Witnesses:
 PAT HENDERSON,
 R. F. LOJOUVNER.